Dec. 8, 1936.    H. J. PLEINES    2,063,119
APPARATUS FOR PRODUCING SLUGS OF EXTRUDED MATERIAL
Filed July 9, 1935    3 Sheets-Sheet 1
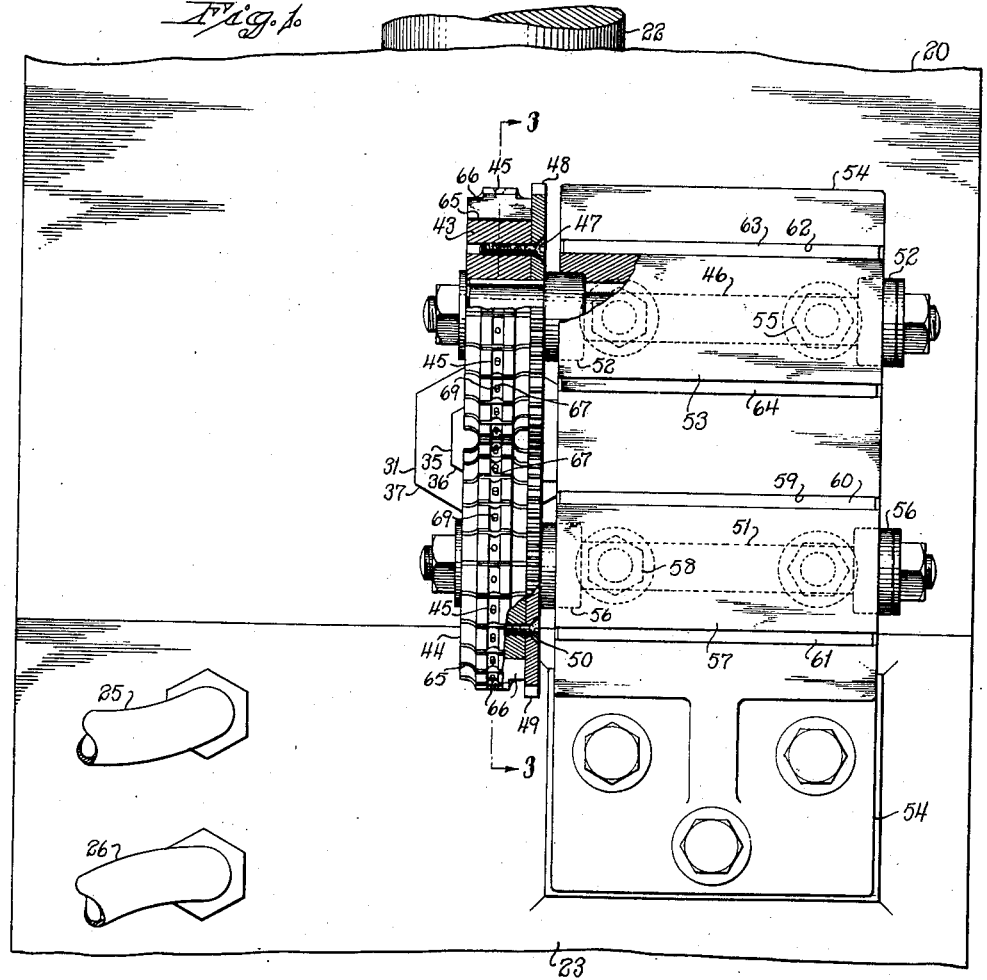
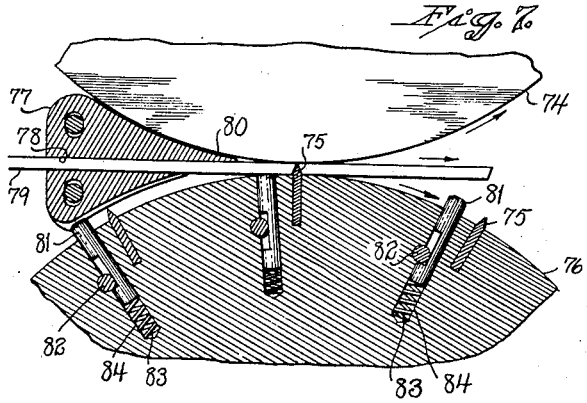

Dec. 8, 1936.  H. J. PLEINES  2,063,119
APPARATUS FOR PRODUCING SLUGS OF EXTRUDED MATERIAL
Filed July 9, 1935  3 Sheets-Sheet 2
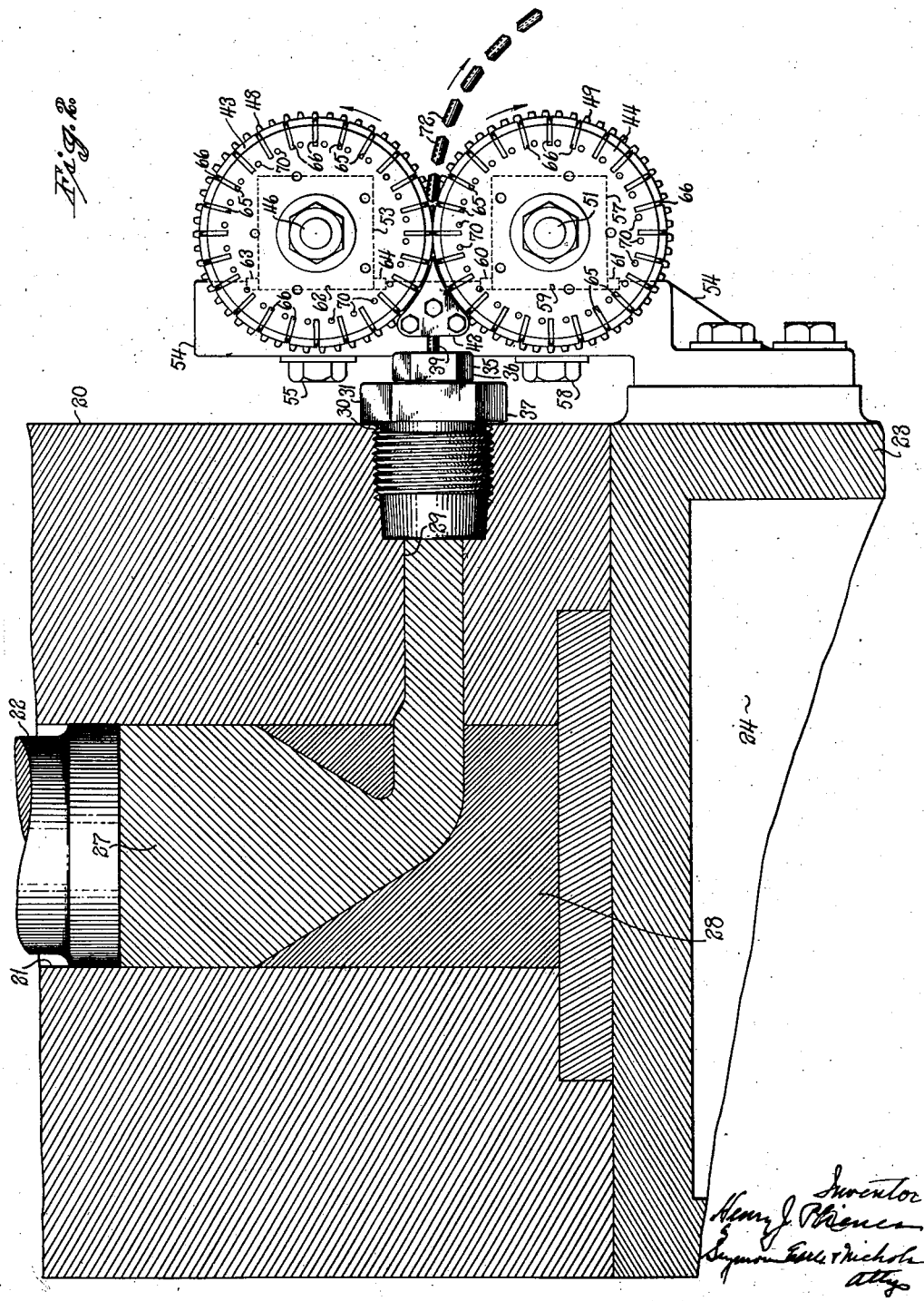

Dec. 8, 1936. H. J. PLEINES 2,063,119
APPARATUS FOR PRODUCING SLUGS OF EXTRUDED MATERIAL
Filed July 9, 1935 3 Sheets-Sheet 3
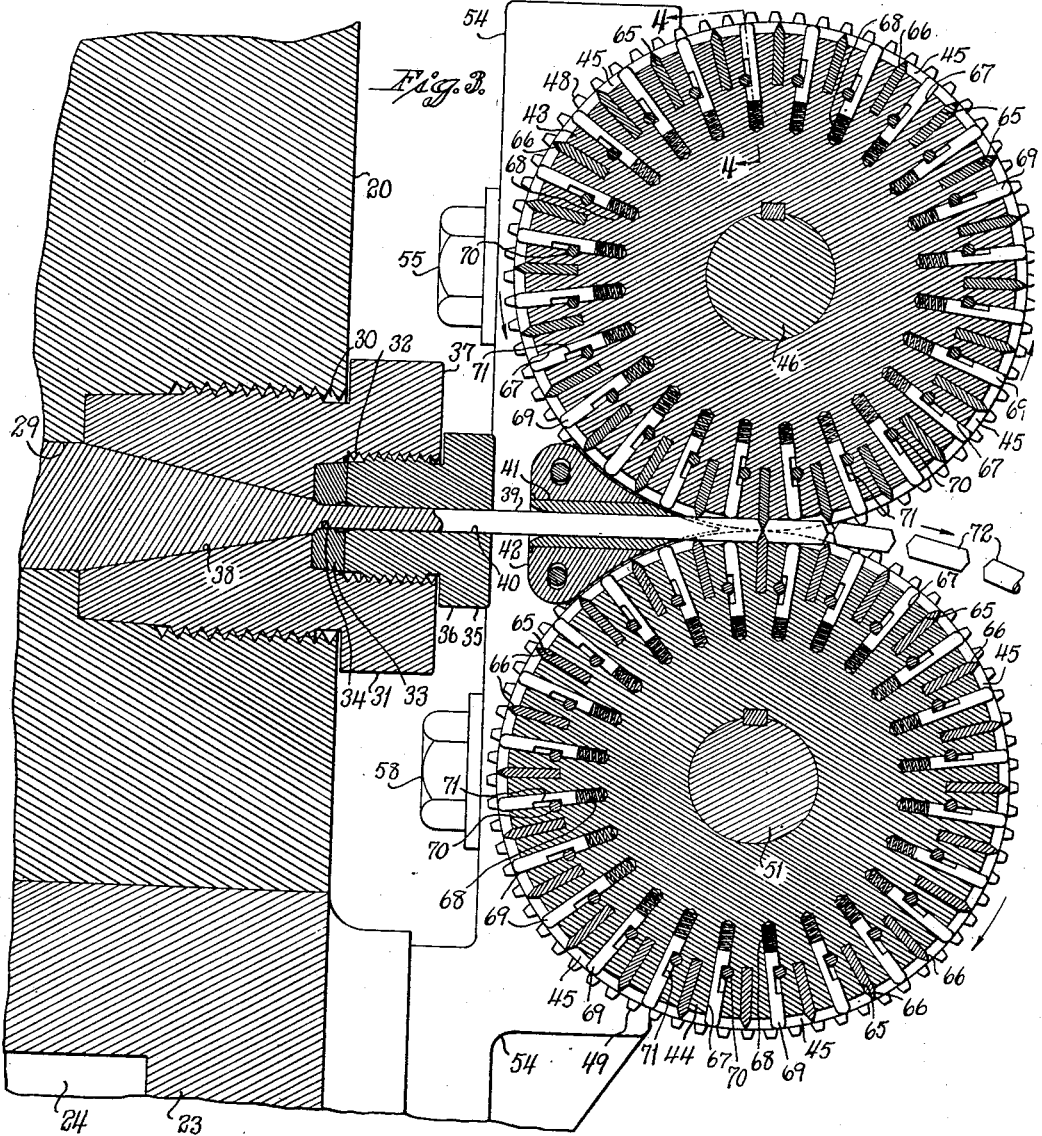
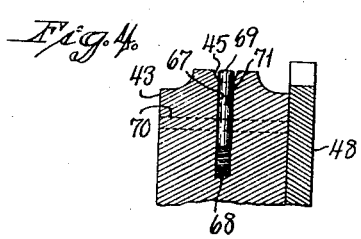

Patented Dec. 8, 1936

2,063,119

UNITED STATES PATENT OFFICE 2,063,119

APPARATUS FOR PRODUCING SLUGS OF EXTRUDED MATERIAL

Henry J. Pleines, West Haven, Conn., assignor to Winchester Repeating Arms Company, New Haven, Conn., a corporation of Maryland Application July 9, 1935, Serial No. 30,494

19 Claims. (Cl. 29—33)

This invention relates to an improvement in apparatus or devices for producing extruded slugs, i. e., relatively short lengths of extruded wire, rod, and the like. The present invention is primarily designed for producing slugs of extruded material for ultimate swaging into bullets, though not so limited.

One of the objects of the present invention is to provide a simple, reliable and effective apparatus of the class referred to having a superior degree of efficiency.

A further object is to provide a superior apparatus for effectively cutting wire, rod, or other strip-like extruded material without subjecting the same to an objectionable degree of stretching or other deformation.

Another object is to provide a superior apparatus for extruding material and automatically cutting the same into predetermined lengths in synchronism with the egress of such material from the extruding means.

A still further object is to provide a combination extruding-and-cutting apparatus in which the cutting feature is accurately synchronized with the extrusion feature.

A still further object is to provide simple, reliable and effective cutting means which may be operated at high speeds.

With the above and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a broken view in front elevation of a combined extrusion and cut-off apparatus embodying the present invention;

Fig. 2 is a broken view thereof, partly in side elevation and partly in vertical central section;

Fig. 3 is a broken sectional view taken on the line 3—3 of Fig. 1;

Fig. 4 is a broken, detail, sectional view taken on the line 4—4 of Fig. 3;

Fig. 5 is a side view of a slug which may be produced with the apparatus shown in the preceding figures;

Fig. 6 is a view in side elevation of a projectile which may be produced by suitably swaging the slug of the preceding figure; and Fig. 7 is a broken view in vertical section illustrating a modified form of cutting device.

The apparatus shown in Figs. 1 to 4 inclusive, and herein chosen for the illustration of one form which the present invention may assume is designed primarily for the production of slugs from extruded wire of relatively soft material, such, for instance, as lead, zinc, and mixtures of lead and zinc, though obviously suitable for producing slugs of other material.

The apparatus in question includes an extrusion press comprising a so-called cylinder-block 20 having a vertical extrusion-chamber 21 therein into the upper end of which is adapted to enter a ram or plunger 22. The cylinder-block 20 is mounted upon the steam-chest 23 having a suitable steam-chamber 24 therein through which latter steam may be circulated by means of suitable tubes, such as 25—26 (Fig. 1).

In any approved manner well known to the art (hydraulic pressure, for instance), the ram or plunger 22 may be moved downwardly into the chamber 21 of the cylinder-block 20 or the said block may be moved toward the said ram to apply pressure to a billet or other body 27 of extrudable material located in the extrusion-chamber 21 of the said cylinder-block 20.

The bottom of the extrusion-chamber 21 is preferably formed by a replaceable deflecting-block 28 having its upper surface contoured to deflect the material of the billet 27 into an extrusion-passage 29 formed partly in the deflecting-block 28 and partly in the cylinder-block 20 and leading laterally outward from the chamber 21. Axially in line with the extrusion-passage 29 the cylinder-block 20 is formed in its outer face with a recess 30 having its outer portion internally threaded for engagement by the externally-threaded portion of a die-holder 31 and having its inner portion shaped to snugly receive the unthreaded inner end of the said die-holder 31.

Also axially in line with the extrusion-passage 29, the die-holder 31 is formed in its outer portion with a recess 32 against the apertured bottom wall of which is positioned a disk-like die 33 having a sizing-passage 34 extending therethrough and held firmly seated against the outwardly-facing inner wall in the die-holder 31 by means of a clamping-bushing 35 having external threads engaging with internal threads formed in the outer portion of the recess 32 and also provided with a polygonal head 36 by means of which it may be screwed into and unscrewed from the die-holder 31. Similarly, the said die-holder 31 is provided with a polygonal head 37 by means of which it may be screwed into and unscrewed from the recess 30 in the cylinder-block 20.

The die-holder 31 above described has leading rearwardly from the inner end of its recess 32 a funnel-shaped passage 38 registering with and in effect forming a continuation of the extrusion-passage 29 in the cylinder-block 20 and deflecting-block 28. The contracted forward end of the funnel-shaped passage 38 just above referred to registers with and is but slightly larger than the sizing-passage 34 in the die 33, which latter passage is proportioned to determine the size and shape of the extruded rod 39 into which the billet 27 is converted. As shown in Fig. 3, the forward end of the sizing-passage 34 of the die 33 is slightly enlarged for clearance purposes to thus minimize friction. The axial passage 40 in the die-clamping bushing 35 is also preferably made slightly larger (plus .010" or .015", for instance) than the diameter of the extruded rod 39, as is also the internal diameter of a guide-tube 41 mounted in an adjustable wedge-shaped holding-block 42.

Mounted in close proximity to the guide-tube 41 and its holding-block 42 are a pair of corresponding disk-like cutter-carriers 43 and 44, each of which is formed in its periphery with an annular groove 45 of semicircular form in cross-section.

The cutter-carrier 43 is keyed to a shaft 46 and has secured to it for concurrent rotation, by a suitable number of screws 47, a gear-wheel 48 which meshes into a similar gear-wheel 49 secured to the cutter-carrier 44 by means of a suitable number of screws 50. The cutter-carrier 44, and hence the gear-wheel 49, is keyed to a shaft 51, as shown, for instance, in Fig. 3.

The pitch-diameters of the gear-wheels 48 and 49 preferably correspond respectively to the diameters of the cutter-carriers 43 and 44, the peripheries of which latter are preferably in substantial contact.

The shaft 46 of the cutter-carrier 43 and gear-wheel 48 is mounted by means of ball bearings 52 in a bearing-block 53, which latter is secured with freedom for vertical adjustment to a bracket 54 by means of bolts 55. The said bracket 54 is suitably secured to and upstands from the steam-chest 23, before referred to.

Similarly, the shaft 51 of the cutter-carrier 44 and gear-wheel 49 is mounted by means of ball bearings 56 in a bearing-block 58, which latter is also secured to the bracket 54 with capacity for vertical adjustment by means of bolts 58. The bearing-block 57 fits into a transverse groove 59 in the outer face of the bracket 54 and is supported therein against accidental vertical displacement by means of replaceable spacing-bars 60 and 61.

Similarly, the bearing-block 53 is positioned in a transverse groove 62 formed in the outer face of the upper portion of the bracket 54, and is clamped therein by means of the bolts 55. The said bearing-block 53 is rigidly held against accidental vertical displacement by means of spacing-bars 63 and 64.

By loosening the bolts 55 and 58, the bearing-blocks 53 and 57 may be vertically adjusted by replacing the spacing-bars 60—61 and 63—64 by other spacing-bars of suitable dimensions.

Each of the cutter-carriers 43 and 44 is formed with an annular series of equidistant transverse radial grooves 65, each of which has driven into it, or otherwise secured in place, a transversely-extending cutting-blade 66, the tapered and sharpened outer edge of each of which is substantially flush with the periphery of the particular carrier 43 or 44 in which it is mounted. The cutting-blades 66 of the cutter-carrier 43 register with and complement the similar cutting-blades of the carrier 44 in sequence as the said carriers concurrently rotate. The coaction of the cutting-blades of one cutter-carrier with those of the other is assured by the gear-wheels 48 and 49 before referred to, which in effect serve as timing-means.

Each cutter-carrier 43 and 44 is also formed with an annular series of equidistant radial sockets 67 of cylindrical form in cross-section and intersecting at their outer ends the annular groove 45 of the carrier in which they are formed. Each of the said sockets is located circumferentially intermediate a given pair of the cutting-blades 66.

In each of the sockets 67 is located a helical spring 68 which serves to outwardly press an inwardly-retirable ejecting-plunger 69. The outward movement of the said ejecting-plungers 69 is limited by a corresponding number of pins 70 mounted in and extending transversely of each of the cutter-carriers. A pin 70 is provided for each of the ejecting-plungers and one thereof extends through a notch 71 formed in the side of the adjacent ejecting-plunger.

It will be noted, by reference to Fig. 3, that the forward portions of both the guide-tube 41 and the holding-block 42 are shaped to substantially conform to the adjacent peripheries of the cutter-carriers 43 and 44, to thus bring the outer end of the said guide-tube 41 into the closest possible proximity to the point where the annular grooves 45 of the respective cutter-carriers coact to form, in effect, a passage of tubular form in cross-section.

It will also be noted that the inner end of the guide-tube 41 is spaced away from the forward face of the die-clamping bushing 35, so that the extruded rod 39 is free of support for a short distance. In the event that the cutter-carriers 43 and 44 should become jammed in such way as to fail to rotate, or in the event that for any other reason the resistance to the outward movement of the rod becomes excessive, the space between the inner end of the guide-tube 41 and the outer face of the bushing 35 will permit the rod 39 to buckle and flow laterally to thus prevent injury to the remainder of the mechanism.

After a billet of suitable material has been installed in the chamber 21 of the cylinder-block 20 and placed under compression, either by the upward movement of the said cylinder-block toward the ram 22, or by the downward movement of the said ram toward the cylinder-block 20, or both, the material of the said billet will be deflected laterally into the passage 29 of the said die-block by the appropriately-shaped upper surface of the deflecting-block 28. From the passage 29 the material being extruded will flow through the funnel-shaped passage 38 in the die-holder 31, thence through the sizing-passage 34 in the die 33. After passing through the sizing-passage 34 as just referred to, the extruded rod will pass outwardly through the axial passage 40 in the bushing 35, thence through the guide-tube 41 and between the cutter-carriers 43 and 44 and into the complementary grooves 45 of the latter.

As the rod is forced outwardly between the complementary cutter-carriers 43 and 44, it will cause the same to rotate and will also cause the cutting-blades 66 of one carrier to approach a complementary cutter of the other carrier to a degree sufficiently close to divide or sever the rod into slugs 72 (Fig. 5). The slugs 72 may then, if desired, be swaged or otherwise altered in shape to produce, for instance, a projectile 73 like that shown in Fig. 6.

As the rod 39 passes between the complementary cutter-carriers 43 and 44, it will serve to depress the adjacent portions of the ejecting-plungers 69. In the event that any of the slugs 72 do not fall free of the grooves in the respective cutter-carriers, the ejecting-plungers 69 will assert themselves after they pass "dead center," so to speak, and properly eject the said slugs.

It will be appreciated from the foregoing that the speed at which the extruded rod 39 passes between the cutter-carriers 43 and 44 determines the speed thereof and serves to accurately divide the same into slugs of lengths which are determined by the spacing of the cutting-blades 66. Thus, the problem of synchronizing the cutting-means with the travel of the rod is automatically effected, as it will be seen that should, for any reason, the rod move slowly, the cutter-carriers 43 and 44 will have a correspondingly-slow peripheral speed. Conversely, should the rate of speed of the rod 39 increase, the peripheral speed of the said cutter-carriers will follow suit.

In practice, it has been found that slugs of commercially-pure lead may be conveniently produced by heating the cylinder-block 20 to a temperature of approximately 160° F. by means of the steam-chest 23. At the temperature given, a pressure of approximately 3000 lbs. per square inch exerted upon the billet 27 will serve to effectively produce the rod 39 and effect its division into slugs 72.

In the production of disintegrating bullets, commonly referred to as "spatter-proof" bullets, composed, for instance, of a mechanical mixture of powdered zinc and powdered lead in approximate proportions 10–20% zinc, 90–80% lead, it has been found that with the cylinder-block 20 heated to a temperature of 160° F., a pressure of approximately 2000 lbs. per square inch will effect both extrusion of the rod and the severance thereof into slugs.

In the production of slugs for swaging into so-called "lubricated" bullets, composed, for instance, of a mechanical mixture of sawdust and powdered lead, a pressure of approximately 2000 lbs. per square inch at 160° F. has been found satisfactory.

It will be appreciated that extruded rod or wire composed of mechanical mixtures such, for instance, as those above referred to, possess but a relatively low degree of tensile strength compared to pure lead, zinc, or alloys, and that, therefore, the apparatus of the present invention is admirably suited for the severance of such rod or wire into the desired short lengths, since the compressive strength of such rod or wire materially exceeds the tensile strength thereof.

It may be here noted that in extruding solid billets of commercially-pure lead, the periphery of such billets should be lubricated with a good grade of machine oil or the like, or the interior surface of the extrusion-chamber should be similarly lubricated, in order to avoid the necessity for unnecessarily high pressures in the chamber 21.

In Fig. 7 is illustrated a slightly modified cutting-mechanism which includes an anvil-wheel 74 having a smooth periphery which coacts with the sharpened ends of blades 75 mounted in a rotary cutter-carrier 76. Mounted adjacent the anvil-wheel 74 and the cutter-carrier 76, just referred to, is a guide-block 77 having a guide-passage 78 leading therethrough and serving to guide a rod or bar of strip-like material 79 between the two said members 74 and 76.

The guide-block 77 is shaped to substantially conform to the surface of the anvil-wheel 74 and to the arc of travel of the blades 75, and the upper portion of its outer end is extended further than its lower portion, as is indicated at 80 in Fig. 7, to prevent the blades 75 from unduly deflecting the strip-like material 79 upwardly as the said blades make initial contact therewith.

Mounted closely adjacent the trailing face of each of the blades 75 is an ejector-plunger 81 having a limiting-pin 82 and resiliently urged outwardly by a helical spring 83 which is mounted, together with the said ejector-plunger, in a radial socket 84 in the cutter-carrier 76.

In Fig. 7, the spacing of the blades 75 is such that one blade ordinarily moves out of contact with the strip-like material 79 before a following blade has made full contact therewith, and it is, therefore, desirable to have the anvil-wheel 74 of the cutter-carrier 76 adjusted so as to maintain a frictional grip upon the strip-like material 79, so that they will be effectively driven.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In combination: an extrusion press having a sizing-passage through which extruded material is forced; and cutting-means controlled directly by the force of movement of the extruded material and serving to sever the same into predetermined lengths.

2. In combination: an extrusion press having a sizing-passage through which extruded material is forced; and cutting-means actuated directly by the force of movement of the extruded material and serving to sever the same into predetermined lengths.

3. In combination: an extrusion press having a sizing-passage through which extruded material is forced; and cutting-means actuated directly by the force of movement of the extruded material and movable thereby in the general direction of its travel and serving to sever the same into predetermined lengths.

4. In combination: an extrusion press having a sizing-passage through which extruded material is forced; and cutting-means including a series of spaced-apart movable blades actuated directly by the force of movement of the extruded material and movable thereby in the general direction of its travel and serving to sever the said extruded material into predetermined lengths.

5. In combination: an extrusion press having a sizing-passage through which extruded material is forced; and two complementary series of spaced-apart movable blades coacting with each other to sever the extruded material into predetermined lengths and actuated directly by the force of movement of the said extruded material.

6. In combination: an extrusion press having a sizing-passage through which extruded material is forced; two complementary series of spaced-apart movable blades coacting with each other to sever the extruded material into predetermined lengths and actuated directly by the force of movement of the said extruded material;

and means operatively interconnecting the two said series of movable blades and serving to synchronize each series thereof with the other series.

7. In combination: an extrusion press having a sizing-passage through which extruded material is forced; two complementary series of spaced-apart movable blades coacting with each other to sever the extruded material into predetermined lengths and actuated directly by the force of movement of the said extruded material; and guide-means extending into a position closely adjacent the point of coaction of the two said series of blades and serving to limit the lateral deflection of the said extruded material.

8. In combination: an extrusion press having a sizing-passage through which extruded material is forced; two complementary series of spaced-apart movable blades coacting with each other to sever the extruded material into predetermined lengths and actuated directly by the force of movement of the said extruded material; and means operatively interconnecting the two said series of spaced-apart movable blades and serving to accurately synchronize each series thereof with the other series.

9. In combination: an extrusion press having a sizing-passage through which extruded material is forced; and two complementary rotary members respectively located on the opposite sides of the path of travel of the said extruded material; at least one of the said rotary members being provided with a series of spaced-apart cutting-blades serving to sever the extruded material into predetermined lengths; the said rotary members being positioned to receive the extruded material between them and to be driven thereby.

10. In combination: an extrusion press having a sizing-passage through which extruded material is forced; and two complementary rotary cutter-carriers respectively located on the opposite sides of the path of travel of the said extruded material and each provided with a series of spaced-apart cutting-blades coacting to sever the extruded material in predetermined lengths; the said cutter-carriers being positioned to receive the extruded material between them and to be driven thereby.

11. In combination: an extrusion press having a sizing-passage through which extruded material is forced; two complementary rotary cutter-carriers respectively located on the opposite sides of the path of travel of the said extruded material and each provided with a series of spaced-apart cutting-blades coacting to sever the extruded material into predetermined lengths; the said cutter-carriers being positioned to receive the extruded material between them and to be driven thereby; and guide-means located closely adjacent both of the said cutter-carriers and serving to limit the lateral deflection of the said extruded material.

12. In combination: an extrusion press having a sizing-passage through which extruded material is forced; two complementary rotary cutter-carriers respectively located on the opposite sides of the path of travel of the said extruded material and each provided with a series of spaced-apart cutting-blades coacting to sever the extruded material in predetermined lengths; the said cutter-carriers being positioned to receive the extruded material between them and to be driven thereby; and timing-means operatively interconnecting the two said cutter-carriers and serving to accurately synchronize each thereof with the other.

13. In combination: an extrusion press having a sizing-passage through which extruded material is forced; two complementary rotary cutter-carriers respectively located on the opposite sides of the path of travel of the said extruded material and each provided with a series of spaced-apart cutting-blades coacting to sever the extruded material into predetermined lengths; the said cutter-carriers being positioned to receive the extruded material between them and to be driven thereby; timing-means operatively interconnecting the two said cutter-carriers and serving to accurately synchronize each thereof with the other; and guide-means located closely adjacent both of the said cutter-carriers and serving to limit the lateral deflection of the said extruded material.

14. In combination: an extrusion press having a sizing-passage through which extruded material is forced; two complementary rotary members respectively located on the opposite sides of the path of travel of the said extruded material, at least one of the said rotary members being formed with an annular groove receiving the extruded material, and at least one thereof being provided with a circumferentially-spaced-apart series of cutting-blades serving to sever the said extruded material into predetermined lengths; and the said rotary members being positioned to receive the extruded material between them and to be driven thereby.

15. In combination: an extrusion press having a sizing-passage through which extruded material is forced; two complementary rotary cutter-carriers respectively located on the opposite sides of the path of travel of the said extruded material by the force of movement of which they are driven, one at least of which is provided in its periphery with an annular groove; and a series of circumferentially-spaced-apart cutting-blades carried by each of the said cutter-carriers and coacting with the cutter-blades of the other cutter-carrier to sever the said extruded material into predetermined lengths.

16. In combination: an extrusion press having a sizing-passage through which extruded material is forced; two complementary rotary cutter-carriers respectively located on the opposite sides of the path of travel of the said extruded material by the force of movement of which they are driven, each of the said cutter-carriers being provided in its periphery with an annular groove registering with the annular groove of the other of said carriers; and a series of circumferentially-spaced-apart cutting-blades carried by each of the said cutter-carriers and extending across the annular groove in each thereof and coacting with the cutting-blades of the other cutter-carrier to sever the said extruded material into predetermined lengths.

17. In combination: an extrusion press having a sizing-passage through which extruded material is forced; two complementary rotary members respectively located on the opposite sides of the path of travel of the said extruded material by the force of movement of which they are driven, at least one of the said rotary members being formed with an annular groove receiving the extruded material, and at least one thereof being provided with a circumferentially-spaced-apart series of cutting-blades serving to sever the said extruded material into predetermined lengths; the said rotary members being positioned to receive the extruded material between them and to be rotated thereby; and ejecting-means projectable into the annular groove of the cutter-carrier and serving to eject the severed lengths of extruded material from the said groove.

18. In combination: an extrusion press having a sizing-passage through which extruded material is forced; of two complementary rotary cutter-carriers respectively located in the opposite sides of the path of travel of the said extruded material in position to be driven thereby and each provided in its periphery with an annular groove registering with the annular groove of the other carrier; a series of spaced-apart cutting-blades carried by each of the said cutter-carriers and extending across the annular groove therein and coacting with the cutting-blades of the other of said cutter-carriers to sever the said extruded material into predetermined lengths; and a series of ejecting-members carried by each of the said cutter-carriers and each having a portion extensible into the annular groove in each of the said cutter-carriers to insure the ejection of the severed lengths of extruded material.

19. In combination: an extrusion press having a sizing-passage through which extruded material is forced; of a rotary cutter-carrier located adjacent the path of travel of the said extruded material in position to be driven directly thereby and carrying a spaced-apart series of cutting-blades sequentially engageable with the said extruded material and serving to sever the same into predetermined lengths.

HENRY J. PLEINES.